| (12) | United States Patent | (10) Patent No.: | US 11,603,298 B2 |
|---|---|---|---|
| | Span | (45) Date of Patent: | Mar. 14, 2023 |

(54) APPARATUS FOR HOISTING AND FORWARDING OF LOGS

(71) Applicant: TAJFUN PLANINA PROIZVODNJA STROJEV D.O.O., Planina Pri Sevnici (SI)

(72) Inventor: Iztok Span, Ljubljana (SI)

(73) Assignee: TAJFUN PLANINA PROIZVODNJA STROJEV D.O.O.

( * ) Notice: Subject to any disclaimer, the term of this patent is extended or adjusted under 35 U.S.C. 154(b) by 750 days.

(21) Appl. No.: 16/611,348

(22) PCT Filed: May 10, 2018

(86) PCT No.: PCT/SI2018/000009
§ 371 (c)(1),
(2) Date: Nov. 6, 2019

(87) PCT Pub. No.: WO2018/212719
PCT Pub. Date: Nov. 22, 2018

(65) Prior Publication Data
US 2020/0079628 A1 Mar. 12, 2020

(30) Foreign Application Priority Data
May 15, 2017 (SI) .................................. P-201700133

(51) Int. Cl.
*A01G 23/00* (2006.01)
*B66F 7/04* (2006.01)
(Continued)

(52) U.S. Cl.
CPC .............. *B66F 7/04* (2013.01); *A01G 23/003* (2013.01); *B27B 31/003* (2013.01); *B27L 7/00* (2013.01); *B65G 13/12* (2013.01); *B66F 7/08* (2013.01)

(58) Field of Classification Search
CPC ................................ A01G 23/003; B66F 7/08
See application file for complete search history.

(56) References Cited

U.S. PATENT DOCUMENTS

| 475,628 A | 5/1892 | Stombs | |
| 5,109,952 A * | 5/1992 | Starks | ................... B66F 7/0625 |
| | | | 182/69.5 |

FOREIGN PATENT DOCUMENTS

| CA | 900881 A | 5/1972 |
| CA | 2312104 A | 6/1999 |

(Continued)

OTHER PUBLICATIONS

International Search Report and Written Opinion dated Aug. 28, 2018 issued in PCT/SI2018/000009 (11 pages).

*Primary Examiner* — Saul Rodriguez
*Assistant Examiner* — Willie W Berry, Jr.
(74) *Attorney, Agent, or Firm* — Haynes and Boone, LLP; William B. Nash

(57) ABSTRACT

An apparatus for hoisting and forwarding of logs enables the forwarding of logs along an axis towards a processing area. The apparatus is adjustable in height either due to various configuration of ground or to various heights of processing area in various wood processing machines, and is comfortable both for each user as well as for manufacturers and distributors. The apparatus is also easy to transport to any desired locations by using a tractor. To this aim, supporting legs on the apparatus are telescopic and connected a bearing framework, with a movable part engaging the ground. Bearing members on a hoisting unit are telescopic and embedded in the bearing framework, with a displaceable part engaging the ground. The bearing framework may be provided on its side and faced away from the hoisting unit, as well as furnished with a coupling member for connecting the apparatus to a tractor.

12 Claims, 1 Drawing Sheet

(51) Int. Cl.
*B65G 13/12* (2006.01)
*B27L 7/00* (2006.01)
*B27B 31/00* (2006.01)
*B66F 7/08* (2006.01)

(56) References Cited

FOREIGN PATENT DOCUMENTS

| | | | | |
|---|---|---|---|---|
| EP | 1375409 | A | 1/2004 | |
| EP | 1885631 | B1 | 2/2008 | |
| FR | 2461629 | A | 2/1981 | |
| WO | WO-2007008179 | A1 * | 1/2007 | ............ B65G 13/02 |

* cited by examiner

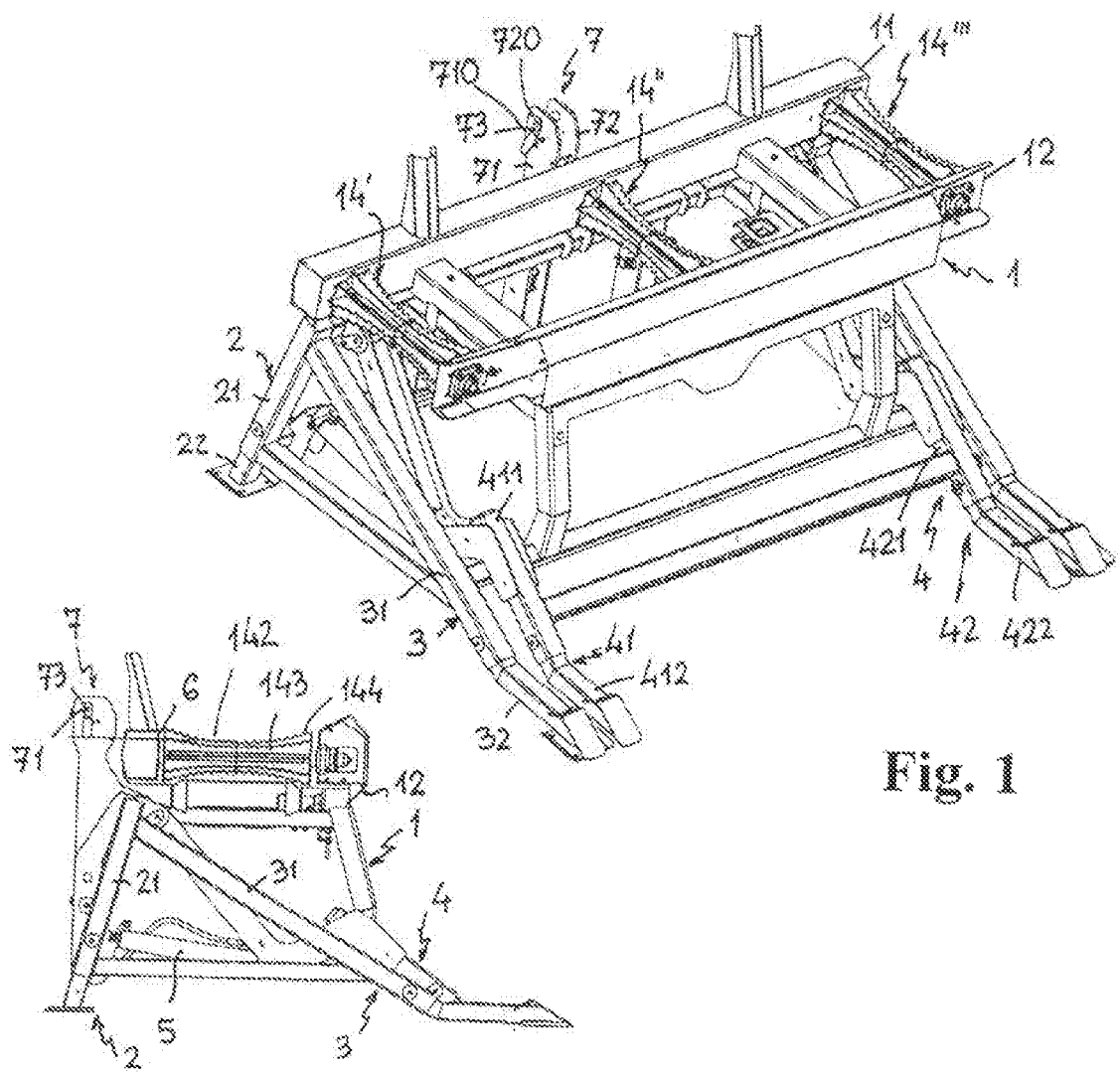

APPARATUS FOR HOISTING AND FORWARDING OF LOGS

CROSS-REFERENCE TO RELATED APPLICATIONS

This application is a United States national phase application of co-pending international patent application number PCT/SI2018/000009, filed May 10, 2018, now European Patent 3,592,687, which claims the benefit of Slovenia Patent Application No. P-201700133 filed May 15, 2017, which are hereby incorporated by reference in their entirety.

BACKGROUND

The present invention belongs to transporting devices, namely devices for hoisting, loading and unloading of heavy loads, in particular for forwarding and transporting, loading, binding, aligning and unloading of logs by cutting or splitting thereof. Pursuant to the International Patent Classification such inventions belong to Class B 65 G 13/00.

In this, the invention is based on a problem how to create a portable apparatus for hoisting of logs, located on each ground, onto a pre-determined elevated level or axis, in which the logs are then cut and/or split for the purposes of firewood processing, wherein the apparatus should also enable forwarding of logs along said axis towards each processing area, and wherein such apparatus should also be adjustable in height either due to various configuration of ground or to various heights of processing area in various wood processing machines, which would be comfortable both for each user as well as for manufacturers and distributors, and moreover, such apparatus should also be as much as possible comfortable in view of transporting thereof to each desired location by means of a tractor.

An apparatus for hoisting and forwarding of logs is disclosed in SI 22054 A as well as in patent equivalents WO 2007/008179 and EP 1 885 631 B 1. Reference is made to these documents. Such apparatus comprises two sequences of crosswise arranged supporting legs, wherein each leg in the first sequence is in a pivot point pivotally connected with s supporting leg of the second sequence, and in which in the terminal area, which is located utmost apart from the ground, levers are attached to said legs of the first sequence, so that at least one lever is attached to each one of the majority of legs. Moreover, the known apparatus comprises a bearing framework, which is pivotally connected on the one hand with those terminal portions of the supporting legs of the second sequence, which are located at the largest distance apart of the ground, and on the other hand with said levers on the supporting legs of the first sequence, wherein said framework is furnished with transversally arranged rollers as well as with at least one forwarding unit. Still further, the known apparatus comprises a hoisting unit, which is pivotally attached to supporting legs of the first sequence and is supported by a hydraulic driving means, which is attached to supporting legs of the second sequence. The legs of the first sequence are firmly interconnected by means of a longitudinal binding, and also legs of the second sequence are firmly interconnected by means of a longitudinal binding, wherein said hoisting unit is furnished with a sequence of levers, which are similarly like the supporting legs in both sequences firmly connected with each other by means of a longitudinal binding. A hydraulic cylinder is serving as a hydraulic driving means. The bearing framework consists of two longitudinal bearing members, between which a plurality of rollers is arranged, which are each per se freely rotatable around axles, which extend transversally with respect to said bearing members, as well as of at least one forwarding unit, which is driven by means of a hydraulic driving means. Preferably there should be two forwarding units available, namely in each terminal area of the framework one forwarding unit, wherein each of said units is furnished with a chain wheel and is rotated by means of a corresponding chain wheel on the hydraulic driving means via corresponding endless chain. Moreover, said driving unit is preferably a welded part, consisting of at least approximately cylindrical central portion, to which a plurality plates is firmly attached, by which said plates are equidistantly spaced apart from each other in the circumferential direction and protrude of radially outwards, and by which each plate is preferably furnished with a concave and saw-like or toothed terminal edge of each plate, which is suitable for supporting of each log when rest thereon.

In general, such apparatus is collapsible and can be upon each use collapsed to minimal dimensions, although it is basically intended for hoisting of logs from the ground onto each pre-determined level in a plane or axis, in which then cutting of logs e.g. to longitudinal sections is performed, wherein the apparatus also enables forwarding of logs along said axis towards each processing area. However, the previously described concept of the apparatus does not allow adapting the apparatus to operate on uneven ground or to be used in combination with various wood processing machines, which is quite uncomfortable for an user, since then combining with different firewood splitting machines is possible only when several various apparatuses in various dimensions would be available. Such limitation is however problematic also for manufacturers, which can difficultly follow various and permanently changing needs of the consumers, who in most cases already possess various wood processing machinery, with which said apparatus then would have to be compatible. In addition to that, the known apparatus could also be from certain points of view declared as pretty uncomfortable for transporting towards each desired working place by means of a tractor or similar working machine. At present, such apparatuses are usually transporter by means of tractor, but are loaded on a tractor trailer, so that an essential part of the space available on the trailer, which could otherwise be exploited for transporting of any other cargo, is then occupied by such apparatus. Several devices, which have been known prior to said apparatus, are also disclosed in v EP-A-1 375 409, CA-A-900 881, FR-A-2 461 629, BE-A-546 682, CA-A-2 312 104 and U.S. Pat. No. 475,628.

The present invention refers to an apparatus for hoisting and forwarding of logs, which comprises a rigid bearing framework, which is furnished with at least two pairs of supporting legs, which are spaced apart from each other and extend towards the ground. Moreover, said apparatus also comprises a hoisting unit, which consists of at least two bearing members, which protrude away from said framework, and which is pivotally embedded within said framework and is by means of a driving unit displaceable from its first position, in which said bearing members are rest on each ground, into its second position, in which at least the terminal portion of each of said bearing members is located above the top level of the framework. Said framework further comprises two longitudinal bearing members, which are spaced apart from each other and extend parallel to each other and between which at least two forwarding units are arranged, such that each of them is rotatable around the horizontal axis, which extends transversally with respect to said longitudinal bearing members, and is either separately or together with any other forwarding unit driving by means of a driving unit.

According to the invention, that each of said supporting legs is telescopically conceived and comprises a basic part, which is firmly connected with said framework, and a movable part, which is adapted to be rest on the ground and is optionally displaceable along the belonging basic part with the possibility of arresting thereof in each desired position, as well as that each of said bearing members of said hoisting unit is also telescopically conceived and consists of a basic part, which is embedded in said framework, as well as of a displaceable part, which is adapted to be rest on the ground and is optionally displaceable along the belonging basic part with the possibility of arresting thereof in each desired position. The invention is furthermore characterized in that said bearing framework is on its side, which is faced away from the hoisting unit, furnished with a coupling member, which consists of two vertical arranged and apart from each other spaced eyes, which extend perpendicularly with respect to said longitudinal bearing members of the framework and are firmly connected therewith, wherein said eyes are furnished with suitable throughout bores, which are adapted to receive suitable bolts, wherein the dimensions and locations of said passages are adjusted to dimensions and locations of bores on a standard coupling assembly on the front side of a tractor.

In one of the embodiments of the invention the basic part of each bearing member of the hoisting unit is tubular, and each corresponding displaceable part is inserted within each belonging basic part.

In an alternative embodiment of the invention the displaceable part of each bearing member of the hoisting unit is tubular, and each corresponding basic part is inserted within each belonging displaceable part.

In a further embodiment of the invention the basic part of each supporting leg is tubular, and each corresponding displaceable part of each supporting leg is inserted within each belonging basic part.

In an alternative embodiment the displaceable part of each supporting leg is tubular, and each corresponding basic part of the supporting leg is inserted within each belonging displaceable part.

A hydraulic driving unit for pivoting said hoisting unit preferably represents at least one hydraulic cylinder, which is on the one hand pivotally connected with the bearing framework and on the other hand pivotally with said hoisting unit, and is supplied by hydraulic media obtained from each disposable hydraulic circuit on a tractor.

A hydraulic driving means for driving of at least one of forwarding units is preferably a hydraulic motor, which is supplied by hydraulic media obtained from each disposable hydraulic circuit on a tractor.

Optionally, at least one of said forwarding units, which is powered by means of a hydraulic driving unit, is furnished with a transmission unit, which is suitable for driving of each residual forwarding units, wherein said transmission unit is preferably a chain transmission.

Moreover, each of said forwarding units is preferably conceived as a welded part, which is formed of at least approximately cylindrical central portion, to which a plurality of radially outwards extending plates is firmly attached. In this, said central portion of each forwarding unit is preferably at least approximately tubular, and said plates are in the circumferential direction equidistantly spaced apart from each other. Each of said plates comprises a terminal edge, which is concave and saw-like formed or toothed.

DRAWINGS

The invention will be disclosed in more detail on the basis of an embodiment and on the basis of the attached drawings, wherein FIG. 1 presents an apparatus for hoisting and forwarding of logs according to the invention, shown in perspective view and in its operational state;

FIG. 2 apparatus according to FIG. 1 in side view and also in operational state; and FIG. 3 the apparatus as shown in FIG. 2, however in its modified state, in which the distance between the operation level and the ground is changed.

DETAILED DESCRIPTION

Apparatus for hoisting and forwarding of logs according to FIGS. 1-3 comprises a rigid bearing framework 1, which is furnished with at least two pairs of supporting legs 2, 3, which are spaced apart from each other and extend towards the ground. Said apparatus further comprises a hoisting unit 4, which consists of at least two bearing members 41, 42, which protrude away from said framework 1.

Said hoisting unit 4 is pivotally embedded within said framework 1 and is by means of a driving unit 5 displaceable from its first position, in which said bearing members 41, 42 are rest on the ground, into its second position, in which at least the terminal portion of each of said bearing members 41, 42 is located above the top level of said framework 1. In this particular embodiment a hydraulic driving unit 5 for pivoting said hoisting unit 4 represents at least one hydraulic cylinder, which is on the one hand pivotally connected with the bearing framework 1 and on the other hand pivotally with said hoisting unit 4, and is supplied by hydraulic media obtained from each disposable hydraulic circuit on a tractor.

Said bearing framework 1 comprises two longitudinal bearing members 11, 12, which are spaced apart from each other and extend parallel with each other and between which at least two forwarding units 14', 14", 14''' are arranged, such that each of them is rotatable around the horizontal axis, which extends transversally with respect to said longitudinal bearing members 11, 12, and is either separately or together with any other forwarding unit driving by means of a driving unit 6.

At least one of said forwarding units 14', 14", 14''' is powered by means of a hydraulic driving unit 6, in particular a hydraulic motor, and is supplied by hydraulic media obtained from each disposable hydraulic circuit on a tractor. Moreover, at least one of said forwarding units 14', 14", 14''', which is powered by means of a hydraulic driving unit 6, is furnished with a transmission unit, which is suitable for driving of each residual forwarding units 14', 14", 14''', in particular with a chain transmission. In the embodiment according to FIGS. 1-3 each of forwarding units 14', 14", 14''' is conceived as a welded part, which is formed of at least approximately cylindrical central portion 143, to which a plurality of radially outwards extending plates 144 is firmly attached. The central portion 143 of each forwarding unit 14', 14", 14''' is at least approximately tubular and said plates 144 are in the circumferential direction equidistantly spaced apart from each other. Each of said plates 144 comprises a terminal edge 142, which is concave and saw-like formed or toothed.

The previously mentioned technical problem is solved in such manner that each of said supporting legs 2, 3 is telescopically conceived and comprises a basic part 21, 31, which is firmly connected with said framework 1, as well as a movable part 22, 32, which is adapted to be rest on the ground and is optionally displaceable along the belonging basic part 21, 31 with the possibility of arresting thereof in each desired position, where at the same time also each of said bearing members 41, 42 of said hoisting unit 4 is telescopically conceived and consists of a basic part 411, 421, which is embedded in said framework 1, as well as of a displaceable part 412, 422, which is adapted to be rest on the ground and is optionally displaceable along the belonging basic part 411, 421 with the possibility of arresting thereof in each desired position. Said bearing framework 1 is on its side, which is faced away from the hoisting unit 4, furnished with a coupling member 7, which consists of two vertical arranged and apart from each other spaced eyes 71, 72, which extend perpendicularly with respect to said longitudinal bearing members 11, 12 of the framework 1 and are firmly connected therewith.

Said eyes 71, 72 are furnished with suitable throughout bores 710, 720, which are adapted to receive suitable bolts 73, and the dimensions and locations of said passages 710, 720 are adjusted to dimensions and locations of bores on a standard coupling assembly on the front side of a tractor.

In a preferred embodiment of the invention, which is shown in FIGS. 1-3, the basic part 411, 421 of each bearing member 41, 42 of the hoisting unit 4 is tubular, and each corresponding displaceable part 412, 422 is inserted within each belonging basic part 411, 421. Also the basic part 21, 31 of each supporting leg 2, 3 is tubular, and each corresponding displaceable part 22, 32 of each supporting leg 2, 3 is inserted within each belonging basic part 21, 31 of each supporting leg 2, 3.

However, a further embodiment of the invention provides that the displaceable part 412, 422 of each bearing member 41, 42 of the hoisting unit 4 is tubular, and each corresponding basic part 411, 421 is inserted within each belonging displaceable part 412, 422 of each bearing member 41, 42.

In a further possible embodiment, the displaceable part 22, 32 of each supporting leg 2, 3 is tubular, and each corresponding basic part 21, 31 of the supporting leg 2, 3 is inserted within each belonging displaceable part 22, 32 of the supporting leg 2, 3.

Those skilled in the art will understand that the previously described apparatus is a portable apparatus, which enables both hoisting of logs located on each ground towards a pre-determined level or axis, in which cutting and/or splitting of logs is performed e.g. due to firewood processing or the like, and also forwarding of logs along said axis towards each processing area.

Besides, the height of the apparatus can be adjusted both to configuration of each ground as well as to various heights of various wood processing machines having different distances of processing area apart from the ground, which is quite comfortable not only for each user, but also for manufacturers and distributors, and which is even much more important, for the purposes of assuring proper stability of the apparatus in particular by hoisting the logs on each desired level, by which also the preconditions for fluent and safe operation are fulfilled.

Moreover, such apparatus is extremely comfortable also in view of transporting thereof to each desired location, since it can be attached to a tractor on the front side thereof, while the three-point coupling mechanism on the rear side of the tractor remains available for coupling of a trailer, which is then in its entirety available for transporting of each cargo and needs not to be occupied by the apparatus according to the invention.

The invention claimed is:

1. An apparatus for hoisting and forwarding of logs, comprising:
   a bearing framework that includes at least two pairs of supporting legs that are spaced apart from each other and that are configured to engage the ground;
   a hoisting unit that includes at least two bearing members that extend away from the bearing framework, wherein the hoisting unit is pivotally coupled to the bearing framework and a driving unit that is configured to provide the hoisting unit in a first position in which the bearing members engage the ground, and a second position in which at least a terminal portion of each of the bearing members is located above a top level of the bearing framework,
   wherein the bearing framework includes two longitudinal bearing members that are spaced apart from each other and that extend parallel to each other, and wherein at least two forwarding units extend transversally with respect to the longitudinal bearing members, are configured to rotate around a horizontal axis, and are configured to be driven by a driving unit, and wherein each of the at least two pairs of supporting legs is telescopic and connected with the bearing framework, and includes a movable part that is configured to rest on the ground,
   and wherein each of the at least two bearing members on the hoisting unit is telescopic, is embedded in the bearing framework, and includes a displaceable part that is configured to rest on the ground,
   and wherein the bearing framework has a coupling member which is located on the side away from the hoisting unit, the coupling member, having two vertically arranged and spaced apart eyes extend perpendicularly with respect to the longitudinal bearing members of the bearing framework and are connected therewith, wherein the spaced apart eyes include throughout bores that are adapted to receive bolts and wherein the dimensions and locations of said throughout bores are adjustable to the dimensions and locations of corresponding throughout bores on a standard coupling assembly on a front side of a tractor.

2. The apparatus of claim 1, wherein each bearing member on the hoisting unit is tubular, and wherein each displaceable part is inserted within each bearing member.

3. The apparatus of claim 1, wherein the displaceable part on each bearing member on the hoisting unit is tubular, and is inserted within each displaceable part on each bearing member.

4. The apparatus of claim 1, wherein each supporting leg is tubular, and wherein each displaceable part on each supporting leg is inserted within each supporting leg.

5. The apparatus of claim 1, wherein each supporting leg is tubular, and wherein each corresponding supporting leg is inserted within each displaceable part on each supporting leg.

6. The apparatus of claim 1, wherein a hydraulic driving unit (5) for pivoting said hoisting unit (4) represents at least one hydraulic cylinder, which is on the one hand pivotally connected with the bearing framework (1) and on the other hand pivotally with said hoisting unit (4), and is supplied by hydraulic media obtained from each disposable hydraulic circuit on a tractor.

7. The apparatus of claim 1, wherein a hydraulic driving means for driving at least one of the forwarding units is a hydraulic motor that is supplied by hydraulic media obtained from at least one disposable hydraulic circuit on the tractor.

8. The apparatus of claim 7, wherein at least one of the forwarding units that is powered by means of a hydraulic driving unit that is provided with a transmission unit and that is configured to drive each of the forwarding units.

9. The apparatus of claim 8, wherein the transmission unit is a chain transmission.

10. The apparatus of claim 1, wherein each of the forwarding units includes a welded part that includes an approximately cylindrical central portion coupled to a plurality of radially outwards extending plates.

11. The apparatus of claim 10, wherein a central portion of each of the forwarding units is at least approximately tubular, and wherein the plates are in the circumferential direction equidistantly spaced apart from each other.

12. The apparatus of claim 11, wherein each of the plates (includes a terminal edge that is concave and that includes teeth.

* * * * *